United States Patent [19]
Bornstein

[11] Patent Number: 4,876,117
[45] Date of Patent: Oct. 24, 1989

[54] METHOD AND COATING TRANSITION METAL OXIDE ON THIN FILM MAGNETIC DISKS

[75] Inventor: Jonathan G. Bornstein, Mountain View, Calif.

[73] Assignee: Domain Technology, Milpitas, Calif.

[21] Appl. No.: 152,119

[22] Filed: Feb. 4, 1988

[51] Int. Cl.$^4$ .............................................. B05D 5/12
[52] U.S. Cl. ................................. 427/130; 427/132; 427/241; 427/425; 427/427; 427/428; 427/436; 427/443.2; 428/64; 428/694; 428/900
[58] Field of Search .............. 427/130, 132, 241, 425, 427/427, 428, 443.2; 428/64, 694, 900

[56] References Cited

U.S. PATENT DOCUMENTS

| | | | |
|---|---|---|---|
| RE. 32,464 | 7/1987 | Aine | 428/622 |
| 3,460,968 | 8/1969 | Bate et al. | 117/62 |
| 3,847,583 | 11/1974 | Dislich et al. | 65/33 |
| 4,277,540 | 1/1981 | Aine | 428/627 |
| 4,411,963 | 10/1983 | Aine | 428/622 |
| 4,503,125 | 3/1985 | Nelson et al. | 428/408 |

OTHER PUBLICATIONS

Yanagisawa, (1985), 21-26.
Suganuma et al., (1982), IEEE Trans. MAG.-18:12-12-1217.
Thomas, (1986), Optics News, Aug., pp. 18-22.
Arfsten, (1984), J. Non-Crystalline Solids, 63:243-249.
Sakka et al., (1984), J. Non-Crystalline Solids, 63:223-235.
Murozono, (1982), Jap. J. Appl. Phys., 21:137-141.

Primary Examiner—Bernard Pianalto
Attorney, Agent, or Firm—Townsend and Townsend

[57] ABSTRACT

Hard magnetic recording disks include a rigid substrate, typically aluminum, ceramic, or glass, having an underlayer thereover, typically being nickel-phosphorus. A ferromagnetic film is formed over the underlayer, and a protective coating layer formed over the ferromagnetic layer. The protective coating layer is a metal oxide formed by applying a liquid metal oxide precursor material over the ferromagnetic layer, and curing the liquid precursor material to leave a metal oxide layer in place. Optionally, a lubricating or carbon layer may be formed over the protective layer.

13 Claims, 2 Drawing Sheets

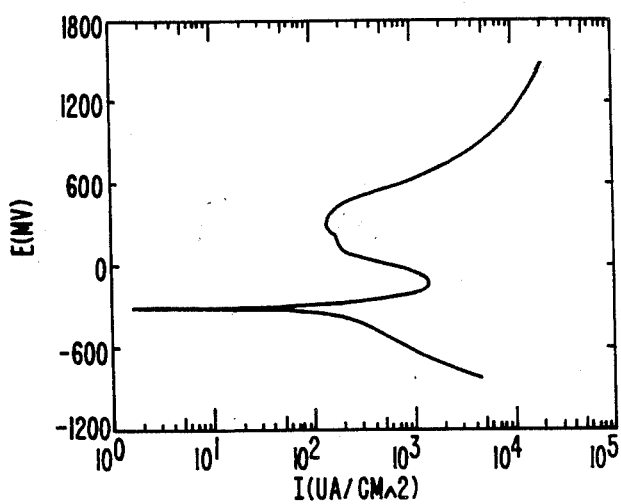
FIG._1.
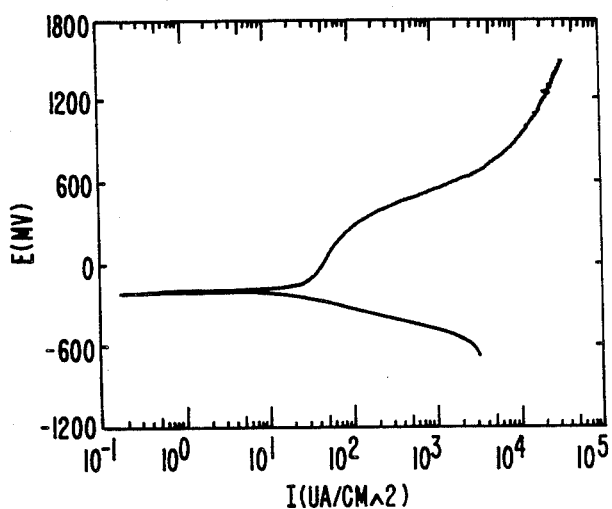
FIG._2.

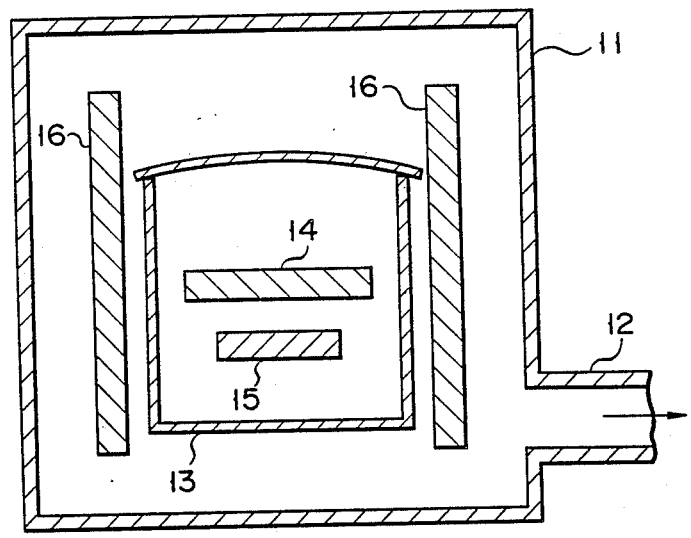
F I G. 1
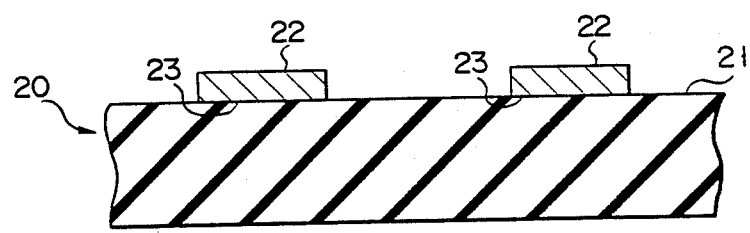
F I G. 2

METHOD AND COATING TRANSITION METAL OXIDE ON THIN FILM MAGNETIC DISKS

BACKGROUND OF THE INVENTION

1. Field of the Invention

The present invention relates generally to magnetic recording disks and methods for their preparation. In particular, the invention relates to the formation of a protective coating over the surface of the magnetic recording disk.

Hard magnetic recording disks comprise a rigid disk substrate, such as aluminum coated with a nickel-phosphorus underlayer, having a thin film of a ferromagnetic composition, such as a magnetic oxide or magnetic alloy, formed thereover. In order to improve the mechanical properties of the disk, other layers may be formed over the ferromagnetic film, typically protective layers and lubricating layers.

Hard disk memory storage devices operate by rapidly rotating the disk while maintaining a magnetic transducer as close to the magnetic (recording) surface of the disk as possible, typically being spaced less than one micron from the disk surface. For reasons best explained elsewhere, such close proximity increases the information storage density on the disk. As a result of the close spacing, as well as head contact which occurs during the starting and stopping of the disk drive, it is desirable that the disks possess a hard protective coating over the recording surface. It is particularly desirable that the protective barrier be lubricious in nature in order to reduce friction between the head and the disk when contact occurs. In addition, because of the propensity for corrosion of magnetic alloys, the protective coating should also provide a high degree of corrosion protection (i.e., passivity) and exhibit low porosity.

Heretofore, such protective layers have generally been formed either from a sputtered carbon or metal layer (see, U.S. Pat. Nos. 4,277,540; 4,411,963; 4,503,125; and U.S. Pat. No. Re. 32,464), or from spin-coated silicon dioxide (Yanagisaw (1985) Tribology and Mechanics of Magnetic Storage Systems 2:21-26 and Suganuma et al. (1982) IEEE Trans. MAG.-18:1212-1217).

Although generally successful, both the sputter deposited layers and the spin-coated silicon dioxide layers suffer from certain drawbacks. In particular, sputter deposition requires a significant capital expenditure which reduces the economic attractiveness of the procedure.

While the spin coating of a silicon dioxide layer is more economic than sputter coating of a carbon or metal layer, the conversion of the silicon hydrate to an oxide form, as taught in the cited references, requires a relatively high temperature treatment. Such high temperature treatment can have an adverse effect on the nickel phosphorus underlayer.

For these reasons, it would be desirable to provide alternate materials and methods for preparing protective layers on hard magnetic recording disks. In particular, it would be desirable that the alternate materials be applied under less rigorous conditions than the spin-coated silicon dioxide layers of the prior art and be applied less expensively and with improved corrosion protection than the sputter-deposited films of the prior art.

2. DESCRIPTION OF THE BACKGROUND ART

Thomas (1986) Optics News, August, pp. 18-22, describes the preparation of optical coatings where a metal alkoxide is applied to an optical surface and converted to the corresponding metal oxide by solvent evaporation. U.S. Pat. No. 3,847,583 describes how alkali oxides and alkaline earth oxides may be incorporated into metal oxide films of the type described by Thomas (1986). Arfsten (1984) J. Non-crystalline Solids 63:243-249 and Sakka et al. (1984) J. Non-crystalline Solids 63:223-235 describe various applications of the conversion of metal alkoxides to metal oxides. Murozono (1982) Jap. J. Appl. Phys. 21:137-141, describe the deposition of titanium dioxide coatings on solar cells by heat treating organo-titanium compounds applied to the solar cell by spinning.

SUMMARY OF THE INVENTION

A protective coating is formed over the recording surface of a hard magnetic recording disk by applying a liquid metal oxide precursor solution in a uniform layer over said surface. The liquid precursor is cured at a moderate elevated temperature, typically in the range from about 100° to 300° C., to obtain a solid metal oxide layer having a thickness in the range from about 50 to 1000 Å. The metal oxide precursor solution is usually a transition metal alkoxide, transition metal halide, or transition metal acetylacetonate dissolved in an organic solvent, usually an alcohol. Suitable metal oxides include those of Groups IVB, VB, and VIB of the Periodic Table, as well as aluminum, indium, and tin, with the oxides of tantalum, titanium, niobium, hafnium, vanadium, zirconium, and aluminum being preferred.

DESCRIPTION OF THE SPECIFIC EMBODIMENTS

The method of the present invention comprises a treatment step for forming a hardened transition metal oxide layer over a rigid magnetic recording disk. Fabrication of the rigid metallic recording disk is conventional up until the point of applying the metal oxide layer. Suitable conventional disk fabrication methods will include both plasma deposition processes and chemical plating porcesses.

Both the plasma deposition and chemical plating fabrication processes rely on forming a thin film of a magnetic material over a rigid disk substrate. The rigid disk substrate is composed of a non-magnetic material, such as aluminum and other non-magnetic metals, ceramics, glass, plastics, ceramic-metal composites, glass-ceramic composites, and the like. The disks are dimensioned to fit in commercially available rigid disk drives, typically having diameters of 3.5 and 5.25 inches, respectively. The surfaces of the disks will be lapped and polished in order to provide a smooth base for receiving the layered materials which make up the magnetic recording disks.

A non-magnetic underlayer will usually be deposited directly over the polished substrate surface. Depending on the type of substrate and the composition of the magnetic material layer, a variety of materials may be used for the underlayer, including nickel, nickel-phosphorus, molybdenum, titanium, chromium, niobium, tantalum, vanadium, tungsten, and the like. The metallic materials may be applied by various techniques, such as sputter deposition, electroplating, electroless plating, and the like, to a thickness in the range from about 400 to 800 microinches, usually being in the range from about 500 to 600 microinches.

The conditions of application will be selected to assure that the underlayer assumes a non-magnetic microstructure. Subsequent heating of the substrate will sometimes have an adverse effect on the underlayer, sometimes converting the structure to a magnetic form which interferes with the desired recording ability. The low temperature process of the present invention avoids such deterioration of the disk.

The chemical plating techniques include both electroplating and electroless plating. Electroless plating techniques are most widely used as they avoid the substantial electricity costs associated with electroplating. In electroless plating, the ferromagnetic film is deposited in a bath by chemical reduction without the application of an electric current. Typically, the rigid disk substrate having the underlayer is immersed in a buffered plating bath including metal salts corresponding to the desired metallic composition of the film, a reducing agent, and one or more chelating agents. The plating bath is maintained at a temperature below boiling, typically in the range from about 60° to 95° C. and deposition of the reduced metals occurs on the surface of the substrate. The deposition is allowed to continue until the ferromagnetic layer reaches a thickness in the range from about one to ten microinches, more usually in the range from about two to six microinches. This will usually take from about one to ten minutes, more typically from about two to six minutes. After the desired thickness of the ferrmagnetic layer has been reached, the substrate is removed from the plating bath, rinsed, and dried.

Detailed methods for the electroless plating of hard disk substrates are described in copending application Ser. No. 138,244, filed on Dec. 28, 1987, the disclosure of which is incorporated herein by reference.

Plasma deposition processes for the ferromagnetic films include sputtering, vapor deposition, and ion plating. Of these, sputtering is the most commonly employed where a target electrode is used as the source of the ferromagnetic material. The target electrode is operated as a cathode in a vacuum environment and metal ions emanating from the cathode are deposited as a film on the coated disk substrate. Particular methods for performing sputter deposition of ferromagnetic layers are described in U.S. Patent Nos. 4,277,540; 4,411,963; and 4,503,125, the disclosures of which are incorporated herein by reference.

After forming a ferromagnetic layer having the desired thickness, the present invention provides for the formation of a metal oxide layer over the ferromagnetic layer. The metal oxide layer is formed by applying a liquid film of a metal oxide precursor material over the recording surface of the disk and curing the liquid precursor to form a hardened oxide.

Suitable metal oxides will be stable under the conditions of use and sufficiently hard to avoid damage in normal use of the described, typically having a hardness exceeding 4 Mohs, preferably exceeding 5 Mohs. The metal oxide liquid precursor will be of a type which can be cured at moderate temperatures to form the desired metal oxide.

The metal oxides of the present invention will usually be formed from aluminum, indium, tin, and transition metals, typically those transition metals in the short transition series found in Groups IVB, VB, and VIB of the Periodic Table. Of particular interest are the oxides of tantalum, titanium, zirconium, niobium, hafnium, vanadium, and aluminum.

Suitable liquid transition metal oxide precursor materials will be metal alkoxides, metal halides, and metal acetylacetonates, all of which are soluble in certain organic solvents, such as alcohols and ketones.

Metal alkoxides have the formula $M(OR)_x$, where M is the transition metal, R is an alkyl moiety, typically having from one to six carbons, more typically having from two to four carbons, and x is the oxidation state of the transition metal. The metal alkoxide reacts with water present in the air to form the corresponding metal hydroxide $M(OH)_x$ and subsequently the metal oxide $M(O)_x$. Preferred metal alkoxides include tantalum ethoxide ($Ta(C_2H_5O)_5$), titanium ethoxide ($Ti(Chd 2H_5O)_4$), zirconium n-butoxide ($Zr(C_4H_9O)_4$), and aluminum sec-butoxide ($Al(OC_4H_9)_3$).

Transition metal actylacetonates have the formula $M(OC(CH_3) CHCO(CH_3))_x$, where M is the transition metal and x is the oxidation state of the transition metal. Preferred transition metal acetylacetonates include tantalum acetylacetonate, titanium acetylacetonate (tianyl acetylacetonate), and zirconium acetylacetonate (zirconium tetraacetylacetonate).

Suitable transition metal halides are of the formula $M_aX_b$, where M is the transition metal and X is the halide. The molar ratio of transition metal to halide (a:b) depends on the particular metal halide employed. The halides may be chlorides, bromides, or iodides. Preferred transition metal halides include tantalum chloride ($TaCl_5$), titanium dichloride ($TiCl_2$), and zirconium tetrachloride ($ZrCl_4$)

The transition metal precursor materials may be dissolved in a wide variety of organic solvents, including alcohols, ketones, acetates, aromatic hydrocarbons, and the like. Preferred is the use of alcohols, particularly ethanol and propanol.

The transition metal oxide precursor materials may be applied by spraying, dipping, roll coating, or spin coating. The thickness of the liquid layer will depend on the desired thickness of the metal oxide layer and is typically in the range from about 1 to 5 microinches, more typically being in the range from about 1 to 3 microinches. The resulting thickness of the cured metal oxide layer will have a thickness which is about 1% to 10% less than the liquid precursor thickness, depending on the concentration of the precursor material in the solvent. Apparatus for performing suitable coating operations are commercially available.

Depending on the manner of application, the viscosity of the liquid metal oxide precursor material may vary in the range from about 0.5 to 3 cp, typically being in the range from about 1 to 2 cp. For spin coating or dip coating, the viscosity will preferably be in the range from about 1 to 2 cp. The viscosity of the liquid precursor solution may be controlled by adjusting the type and amount of solvent(s) and/or the concentration(s) of the metal oxide precursor(s), with the limitation that sufficient solvent must be present to dissolve the metal oxide precursors.

The disks coated with the metal oxide precursor material, as described above, are cured at an elevated temperature for a time sufficient to evaporate the solvent, leaving the hardened metal oxide layer on the recording surface. Only moderate cure temperatures in the range from about 100° to 300° C., more usually from about 225° to 250° C., are required for the curing of transition metal oxides, in contrast to silicon dioxide layers which require higher temperature, usually above about 1000° C. for obtaining full film density.

The curing heat may be applied convectively, typically in an air oven, or radiantly, typically in rapid thermal processing equipment, such as that commercially available from Peak Systems, Fremont, Calif., and AG Associates, Sunnyvale, Calif. Usually, treatment in air ovens will require a somewhat longer time, usually on the order of 30 to 180 minutes, more usually on the order of 60 to 120 minutes, at temperatures in the 225° to 250° C. range. Treatment by rapid thermal processing equipment will usually require a much shorter treatment time, as the surface temperatures can rapidly be raised without raising the bulk temperature of the substrate disk. Rapid thermal processing treatment times will typically be in the range from about 1 to 60 seconds, more typically being in the range from about 10 to 30 seconds. p The hard magnetic recording disk having the cured metal oxide protective layer over the recording surface may be used without further treatment. In some cases, however, it may be desirable to apply a lubricating layer over the metal oxide layer surface. Suitable lubricants include stearic acid and perfluorinated polyethers which may be applied by conventional dip coating or roll coating processes. The thicknesses of such lubricating layers will usually be in the range from about 0.1 to 0.2 microinches.

In addition to the lubricating layer, a sputter-deposited carbon layer may be applied over the metal oxide layer and beneath the lubricating layer. The carbon layer will have a thickness in the range from about 0.5 to 2 microinches to enhance the wear resistance of the disk surface.

The following examples are offered by way of illustration, not by way of limitation.

EXPERIMENTAL

A comparison between the ability of $Ta_2O_5$ applied according to the principles of the present invention and sputter-coated carbon to inhibit corrosion was performed as follows.

A 1% equivalent oxide solution of Ta(V) ethoxide in ethanol was spin-coated on a Co-P 95 mm disk and cured for 2 hours at 250° C. resulting in a $Ta_2O_5$ layer approximately 300 Å thick. A carbon layer having an equivalent thickness (275 Å) was applied to a similar disk by sputter deposition.

Each disk was placed in an electro-chemical corrosion cell and subjected to a series of potentiodynamic anodic polarization scans using an EGG 273 Potentiostat and Electrometer with a saturated calomel reference electrode and graphite counter electrode. The scan rate was 2 mV/sec and the solution was 0.01 N $HNO_3$. The results are shown in FIGS. 1-4.

DESCRIPTION OF THE DRAWINGS

In FIG. 1, the potentiodynamic anodic polarization scan of the carbon-coated disk clearly displays an active region or nose indicating corrosion and pitting.

In FIG. 2, a similar scan of the $Ta_2O_5$ coated disk displays no such active region, indicating no significant corrosion of the underlying Co-P layer.

FIG. 3 is an overlay of FIGS. 1 and 2 to facilitate comparison.

FIG. 4 is a similar potentiodynamic scan of Co-P 95 mm disk without a protective layer. Substantial pitting and corrosion is evident.

Although the foregoing invention has been described in some detail by way of illustration and example for purposes of clarity of understanding, it will be obvious that certain changes and modifications may be practice within the scope of the appended claims.

What is claimed is:

1. A method for forming a protective coating over the surface of a magnetic recording disk, said method comprising:

applying a uniform layer of a liquid metal oxide precursor solution over the surface of the magnetic recording disk, said metal being selected from the group consisting of Groups IVB, VB and VIB of the Periodic Table and aluminum, indium, and tin; and heating the layer on the disk to a temperature in the range from about 100° to 300° C. for a sufficient time to convert the precursor to a hardened layer of the corresponding metal oxide.

2. A method as in claim 1, wherein the liquid metal oxide precursor solution is an organic solvent having a metal compound selected from the group consisting of metal alkoxides, metal halides, and metal acetylacetonates dissolved therein.

3. A method as in claim 1, wherein the metal oxide precursor is aluminum sec-butoxide $Al(OC_4H_9)_3$.

4. A method as in claim 1, wherein the metal is selected from the group consisting of tantalum, titanium, niobium, zirconium, aluminum, hafnium, and vanadium.

5. A method as in claim 1, wherein the liquid metal oxide precursor solution has a viscosity in the range from about 0.5 to 3 cp.

6. A method as in claim 5, wherein the liquid metal oxide precursor solution is applied to a thickness in the range from about 50 to 1000 Å.

7. A method as in claim 6, wherein the liquid metal oxide precursor solution is applied by a process selected from the group consisting of spin coating, dipping, roll coating, and spraying.

8. A method as in claim 1, wherein the metal oxide precursor is heated in the presence of an acid catalyst.

9. A method as in claim 1, wherein the metal oxide precursor is tantalum ethoxide ($Ta(C_2H_5O)_5$) dissolved in an organic solvent.

10. A method as in claim 1, wherein the metal oxide precursor material is titanium ethoxide $Ti(Chd 2H_5O)_4$ dissolved in an organic solvent.

11. A method as in claim 1, wherein the metal oxide precursor is tantalum chloride ($Ta_2Cl_5$) dissolved in an organic solvent.

12. A method as in claim 1, wherein the metal oxide precursor is zirconium n-butoxide ($Zr(C_4H_9O)_4$) dissolved in an organic solvent.

13. A method as in claim 1, wherein the metal oxide precursor is zirconium tetrachloride ($ZrCl_4$) dissolved in an organic solvent.

* * * * *